| United States Patent [19] | [11] 3,790,403 |
|---|---|
| Ribbans, III | [45] Feb. 5, 1974 |

[54] GLASS FABRIC COATED WITH CRACK-FREE FLUOROCARBON RESIN COATING AND PROCESS FOR PREPARING

[75] Inventor: Robert Clark Ribbans, III, Wilmington, Del.

[73] Assignee: E. I. DuPont de Nemours and Company, Wilmington, Del.

[22] Filed: Jan. 13, 1972

[21] Appl. No.: 217,846

[52] U.S. Cl. ............... 117/76 T, 74/231 R, 117/54, 117/113, 117/126 GB
[51] Int. Cl. ........................................... B32b 17/04
[58] Field of Search ...... 117/76 T, 126 GB, 113, 54

[56] References Cited
UNITED STATES PATENTS

| 2,972,549 | 2/1961 | Goldsmith | 117/126 GB X |
|---|---|---|---|
| 3,369,926 | 2/1968 | Eakins | 117/113 X |
| 2,539,329 | 1/1951 | Sanders | 117/126 GB |
| 2,710,266 | 6/1955 | Hochberg | 117/126 GB |
| 2,989,433 | 6/1961 | Yuan | 117/126 GB |
| 3,168,426 | 2/1965 | Blackie | 117/126 GB X |
| 3,306,155 | 2/1967 | Zumeta et al. | 117/126 GB |

Primary Examiner—Ralph Husack

[57] ABSTRACT

Glass fabric coated with polytetrafluoroethylene is made crack-free by applying a top coat of a melt fabricable tetrafluoroethylene copolymer which is heat bondable to said polytetrafluoroethylene, followed by heating the resultant fabric sufficiently to sinter the polytetrafluoroethylene; this heating also melts the copolymer top coat. A polytetrafluoroethylene over coat can be applied to the copolymer top coat if desired. The dip coating process for applying the polytetrafluoroethylene to the glass fabric is improved by flooding a surface of the fabric with an aqueous dispersion of polytetrafluoroethylene prior to dip coating so that wicking of the dispersion through the thickness of the fabric occurs prior to dip coating.

7 Claims, 6 Drawing Figures

PATENTED FEB 5 1974  3,790,403

GLASS FABRIC COATED WITH CRACK-FREE FLUOROCARBON RESIN COATING AND PROCESS FOR PREPARING

The present invention relates to coated glass fabrics and more particularly to crack-free fluorocarbon resin coatings on glass fabrics.

Glass fabrics coated with polytetrafluoroethylene have been available but these coated fabrics usually suffer from the deficiency of having poor weatherability which limits their application. Even in applications not requiring weatherability, such as indoor conveyor belts, utility of the belts is hampered by the tendency of the object being conveyed to peel off pieces of polytetrafluoroethylene coating from the glass fabric despite the nonstick nature of the coating.

It is believed that the poor weatherability of polytetrafluoroethylene-coated fabrics and tendency of the coating to peel from the fabric is due to microscopic cracks in the polytetrafluoroethylene coating. In the case of weathering, elements such as moisture are believed to penetrate the polytetrafluoroethylene coating and corrode the glass fabric fibers causing it to fail. In the case of peeling, the conveyed object if sufficiently fluid is believed to enter the cracks in the polytetrafluoroethylene coating, pulling the coating away from the fabric when the object is removed from the conveyor belt.

The present invention provides a method for avoiding microscopic cracks in the fabric coating and the resultant crackfree coated product. More specifically, the present invention is a glass fabric having a base coat of sintered polytetrafluoroethylene and a fused thereto top coat of a melt fabricable tetrafluoroethylene copolymer. The present invention will be further described hereinafter with reference to the accompanying drawings in which.

Figure 1:
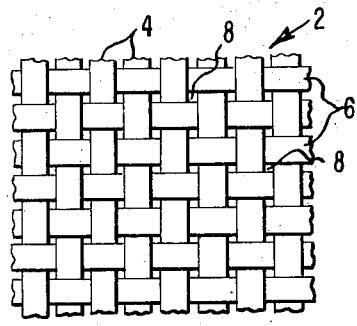
FIG. 1 is a plan view of a piece of woven glass fabric enlarged about 4X.
Figure 2:
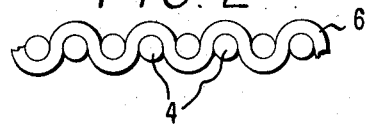
FIG. 2 is a side view of the fabric of FIG. 1.

The glass fabric used in the present invention is any conventional glass fabric woven from glass yarn, illustrated in FIGS. 1 and 2 as fabric 2 containing warp yarn 4 and fill yarn 6. The criss-crossing yarns 4 and 6 form apertures 8 between the yarns. The denier of the yarn and weave of the fabric can be selected to suit the application intended, subject to the ability of the polytetrafluoroethylene base coat and melt fabricable tetrafluoroethylene copolymer topcoat to form a continuous coating on the fabric, i.e., the coated fabric impervious to air.

The polytetrafluoroethylene coat on the glass fabric is the fine powder or dispersion type of polytetrafluoroethylene, sintered after application to the fabric. This type of polytetrafluoroethylene is available in the form of an aqueous dispersion which can conveniently be used to coat the glass fabric. The average particle diameter of the polymer particles in the dispersion are generally between 0.1 to 0.5 micron, preferably at least 0.22 micron and more preferably at least 0.30 micron.

The average particle diameter can be determined by the light scattering technique disclosed in U.S. Pat. No. 3,391,099 to Punderson; if surfactant is present in the dispersion, the refractive index increment is taken as 0.020. Surfactant is usually present in the polytetrafluoroethylene aqueous dispersions in amounts from 1 to 15 percent by weight based on polytetrafluoroethylene solids to aid in wetting the surfaces to which they are applied. Examples of surfactants are the non-ionic surfactants such as ethoxylated aliphatic alochols and ethoxylated alkyl phenols, such as polyethylene glycol monopara-octyl phenyl ether ("Triton X–100") and those represented by the formula $RA_nOH$ wherein $A_n$ is the group $(OCH_2H_4)_n$ or a mixture of groups $(OC_2H_4)_a$ and $(OC_3H_6)_b$, wherein $n$ in each instance is an integer from 2 to 50, preferably 2 to 18, $b$ is an integer of 0 to 30, and $a$ is an integer of at least 2, $a+b$ being equal to $n$; R is an aliphatic group which can be saturated or unsaturated, straight-chained, branched, or cyclic, and will generally contain from six to 24 carbon atoms. A preferred species of surfactant is represented by the formula $CH_3(CH_2)_n(OCH_2CH_2)_mOH$ wherein $n$ is an integer of 6 to 10 and $m$ is an integer of 3 to 6.

In the past, glass fabric has been coated by dipping it into polytetrafluoroethylene aqueous dispersion, followed by drying and sintering. Coated fabric was usually redipped, dried and sintered a number of times to build up the desired thickness. The speed at which the fabric entered the dispersion for the first coat and some subsequent coats was limited by the rate at which the dispersion wicked along the fabric length to displace air. Excessive speed resulted in microscopic air bubbles being trapped in the fabric or in the polytetrafluoroethylene coating. The air bubbles if trapped next to the yarn prevented coating of the yarn by the polytetrafluoroethylene or if trapped in the coating, the bubbles weakened the coating. In either case, the bubbles led to later intrusion of corrosive elements into the fabric. The bubbles also tended to colonize into patches of foam that detracted from the fabric aesthetics.

The bubble problem was usually overcome by using a dipping rate which did not exceed the rate at which air was displaced from the fabric. The dipping rate (coating speed) could be increased somewhat without attendant bubble entrapment by diluting the polytetrafluoroethylene dispersion with water such as to 25 to 50 percent solids from the 55 to 65 percent solids normally supplied. This dilution reduced the viscosity of the dispersion which increased its wicking rate into the fabric and thus the rate of air displacement from the fabric. This dilution, however, had the disadvantage of decreasing the amount of coating applied per dip of the fabric into the dispersion, thus increasing the number of dips required to obtain a given coating thickness (weight).

Figure 3:
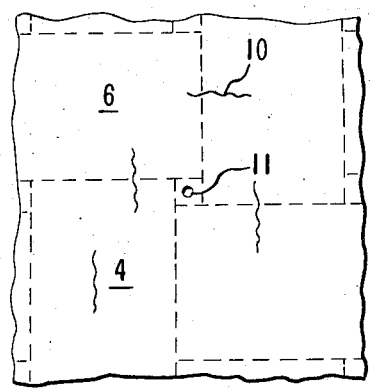
FIG. 3 is a plan view of a portion of the fabric of FIG. 1 in further enlargement and having a coat of polytetrafluoroethylene thereon partially closing the aperture between yarn of the fabric.
Figure 4:
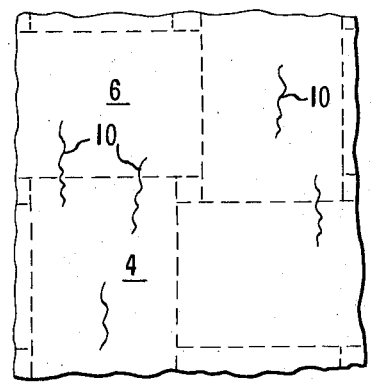
FIG. 4 is a plan view of the coated fabric of FIG. 3 in which further coating with polytetrafluoroethylene has closed the aperture between the yarn.

In any event, whether single or multiple coatings with or without eliminating bubbles or concentrated or dilute dispersions of polytetrafluoroethylene have been used, the result has invariably been the same, i.e., microscopic cracks have formed in the fabric coating on fabrics especially when the fabrics are heavy weight, viz. weight at least 8 oz./yd.$^2$ (277 g./m.$^2$) of fabric surface (one surface). The heavy weight fabrics generally have a thickness of at least 8 mils (0.2 mm.). The microscopic cracks in the coating are visible at a magnification of 20X. Lighter weight fabrics can sometimes be coated with crack-free coatings of polytetrafluoroethylene if care is taken in applying the coating and only a very thin coating is applied. The cracks that form in the polytetrafluoroethylene coating are represented by jagged lines 10 shown in FIG. 3 wherein the amount of polytetrafluoroethylene is insufficient to close the aperture 8 between the yarn and thus leaves an opening 11 in the coating which extends through the thickness of the fabric. Typically, the cracks form during drying, and sintering does not completely heal them. Repeated coating of the fabric with polytetrafluoroethylene while filling up the opening 11 does not heal the cracks in the preceding coating and may generate new cracks as shown in FIG. 4. This is especially true for the heavy weight fabrics. The cracking problem is especially severe with the heavy weight fabrics, because the dispersion tends to gravitate toward the warp and fill yarn junctions and apertures 8. Thus, the microscopic cracks tend to start from these regions, but as the coating thickness is increased by the recoating step, the cracks extend over the entire surface of the fabric in a "mud-crack" type of pattern.

It has been the practice in industry to alleviate crack formation by calendering the fabric after coating with polytetrafluoroethylene. This operation is done on dried but unsintered polytetrafluoroethylene. Sintering is done later as an additional operation. The calendering process preforms the dried, unsintered polytetrafluoroethylene into a continuous crack-free coating which, upon sintering, remains crack free. While calendering is generally successful to this end, it has the limitation of not being applicable where it would undesirably distort the glass fabric or where the width of the glass fabric is too great to be handled by available calendering equipment.

The present invention provides crack-free polytetrafluoroethylene coating on glass fabric without requiring calendering. This improvement is obtained by coating the fabric with an aqueous dispersion of polytetrafluoroethylene and drying the dispersion as done heretofore, in which case microscopic cracks form in the dried coating. This polytetrafluoroethylene base coat on the fabric can consist of one or more coatings of polytetrafluoroethylene, depending on the thickness (build up) of coating desired. Preferably, sufficient base coat is present to fill up the apertures 8 in the fabric.

The polytetrafluoroethylene base coat is made crack free, however, by applying a top coat of melt fabricable tetrafluoroethylene copolymer over the polytetrafluoroethylene base coat. Upon heating the fabric sufficiently to sinter the polytetrafluoroethylene, the copolymer which has a lower melting point also melts and upon cooling fuses to the polytetrafluoroethylene base coat on the fabric at the same time the microscopic cracks in the base coat disappear. Whether the copolymer merely fills the cracks or actually promotes the cracks to heal themselves during sintering is not certain. What is required is that the copolymer be sufficiently compatible with polytetrafluoroethylene so that the copolymer will bond to polytetrafluoroethylene upon sintering in contact with the copolymer and then cooling.

Description of the top coat as being fused to the base coat means that the top coat was melted in contact with the base coat and upon cooling, bonds thereto. The compatibility of the copolymer for the polytetrafluoroethylene and thus the ability to bond or fuse to the base coat can be characterized as being such as to achieve a peel strength of at least 4 lb./in. (0.7 kg./cm.) of width. Peel strength can be measured using an Instron tensile tester operating at a jaw speed of 10 in./min. (25.4 cm./min.) to peel a fused coating of the copolymer at an angle of about 180° from a sintered coating of the homopolymer. The force required to start the copolymer peeling from the coating, i.e., the breakaway force, is the peel strength. The test samples are one inch (2.54 cm.) wide so that the force read from the tester is in terms of per inch of width.

By melt fabricable is meant that the copolymer can be fabricated by conventional melt processing techniques, such as melt extrusion, which polytetrafluoroethylene is not. In order to be melt fabricable, the copolymer has a specific melt viscosity of less than $10^7$ poises measured at 380°C. under a shear stress of 0.457 kg./cm.$^2$, using the equipment and procedure disclosed in U.S. Pat. No. 2,946,763 to Bro et al. Polytetrafluoroethylene (i.e., the homopolymer) has a specific-melt viscosity in excess of $10^9$ poises under the same conditions.

With due regard for the compatibility requirement of the copolymer for the homopolymer, the copolymer is made by copolymerizing tetrafluoroethylene with at least one other copolymerizable ethylenically unsaturated monomer in a sufficient amount to obtain the melt fabricable condition while still maintaining a high molecular copolymer. Generally, a specific-melt viscosity of at least $10^3$ poises under the above conditions is desired for the copolymer. The other monomer content will usually be from 1 to 35 percent based on the weight of the copolymer. The preferred monomers are the perfluoroalkylenes containing at least three carbon atoms such as hexafluoropropylene, perfluoro(alkyl vinyl ethers) such as perfluoro-(propyl vinyl ether), and perfluoro-(2-methylene-4-methyl-1,3-dioxolane). Copolymers of tetrafluoroethylene and any of these monomers are compatible with the homopolymer.

The melt fabricable tetrafluoroethylene copolymer is conveniently dip coated or otherwise applied to the polytetrafluoroethylene base coat from an aqueous dispersion of the copolymer. This cycle can be repeated as desired to deposit the amount of copolymer required to heal the cracks in the polytetrafluoroethylene base coat. The same surfactants and amounts used in the polytetrafluoroethylene dispersion can be used in the copolymer dispersion.

Figure 5:
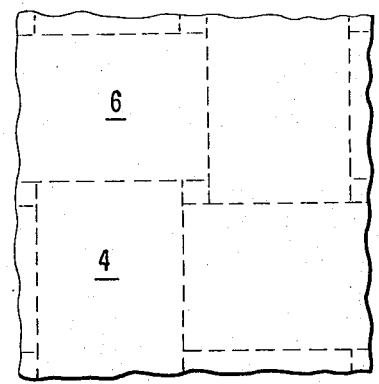
FIG. 5 is a plan view of the fabric of FIG. 4 having a top coat of melt fabricable tetrafluoroethylene copolymer fused to the polytetrafluoroethylene coat.

The melt fabricable tetrafluoroethylene copolymer is preferably applied to the polytetrafluoroethylene coating while the latter is in the unsintered form on the glass fabric because of the greater wettability of the copolymer for unsintered polytetrafluoroethylene. However, the copolymer can also be applied onto the sintered polytetrafluoroethylene base coat if steps are taken to make the copolymer wet the base coat. In any event, the fabric is eventually heated to a temperature at which the polytetrafluoroethylene base coat sinters, which is at least 327°C. and preferably at least 350°C. for sufficient time to obtain sintering. The resultant coating on the fabric is crack free (under magnification of 20X) and continuous over the surface of the fabric, having the appearance shown in FIG. 5.

The present invention although useful in obtaining crack-free coatings on all woven glass fabrics having a reasonably tight weave is especially useful in coating the heavier weight fabrics, i.e., weighing at least 8 oz./yd.$^2$ (277 g./m.$^2$), wherein the cracking problem is the most severe. These heavy weight fabrics, e.g., type 141 fabric which is 8 mils (0.22 mm) thick, lead to cracking of the polytetrafluoroethylene coating more than the lighter weight fabrics, e.g., 116 fabric which is 4 mils (.10 mm.) thick, because of the increased roughness or contour of the surface of the thicker fabrics and the increaee in size of the apertures between yarn of the fabric. The increased surface roughness of the thicker fabric requires a thicker coat of polytetrafluoroethylene to completely cover the fabric, and polytetrafluoroethylene coatings are known to have a limited thickness (critical thickness) before "mud cracks" form in the dried coating. Typically, the critical thickness of polytetrafluoroethylene coating is less than 2 mils (0.05 mm.) on a smooth surface. The polytetrafluoroethylene applied to the fabric from a dispersion tends to migrate towards the yarn junctions giving increasing thickness to the coating and tendency towards cracking at these junctions as compared to elsewhere on the fabric.

The increased aperture size in thicker fabrics requires a sufficient quantity of polytetrafluoroethylene to fill the apertures. The thicker the fabric, the larger the apertures, and the larger the apertures, the more polytetrafluoroethylene that is required to fill the apertures. This demand for polytetrafluoroethylene also leads to cracking of the coating.

Thus, the present invention is especially useful for coating woven glass fabrics wherein any width dimension of the apertures between yarn of the fabric exceeds the critical thickness of the polytetrafluoroethylene for that particular surface, which means that in order for the apertures to be filled with polytetrafluoroethylene, cracks will be present in the coating for healing by the top coat of melt-fabricable tetrafluoroethylene copolymer according to the present invention. On fabric surfaces, the polytetrafluoroethylene applied from an aqueous dispersion can sometimes span apertures which are as much as 5 mils (0.13 mm.) wide without cracking on drying; this size apertures are found in the type 141 fabric. Except for this borderline heavy weight fabric, the heavy weight fabrics will generally have apertures in which the smallest width dimension is at least 6 mils (0.15 mm.) and thus the present invention is valuable in healing the cracks in the apertures of these fabrics. The preferred fabrics to be coated according to the present invention have a thickness of at least 15 mils (0.38 mm.). Usually the fabric thickness will not exceed 30 mils (0.76 mm.) unless the ultimate application for the fabric requires greater fabric thickness. Such preferred fabrics have apertures, the smallest width of which is usually at least 8 mils (0.20 mm.).

A preferred coating process of the present invention involves coating the glass fabric with a concentrated polytetrafluoroethylene aqueous dispersion i.e., 55 to 65 percent by weight in order to take advantage of the economy of obtaining high coating thickness per pass through the dispersion. As previously pointed out, the rate at which the fabric is dipped into the dispersion on the first coat is regulated so that the air in the glass fabric has a chance to be removed by the wicking action of the aqueous dispersion into the fabric. If the dip rate exceeds the wicking rate along the fabric, air bubbles will be trapped by the dispersion. Not only does the wicking rate decrease as the dispersion viscosity increases, but the wicking rate also decreases as the fabric thickness (weight) increases.

Figure 6:
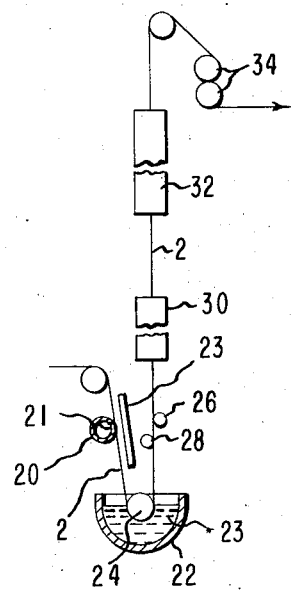
FIG. 6 shows schematically in side elevation an improved process and apparatus for coating glass fabric with polytetrafluoroethylene.

In the preferred process, bubble-free coating at high rates is realized by flooding the cloth with the polytetrafluoroethylene dispersion prior to dipping into the dispersion. The flooding is accomplished by contacting one surface of the fabric with the dispersion so that wicking occurs in the direction through the thickness of the fabric rather than along its length as in dip coating. FIG. 6 shows one method of achieving this flooding action. As the fabric 2 travels to the dip tank 22 containing aqueous dispersion 23 of polymer, it passes in front of a pipe 20 having a slot-shaped opening 21 facing the fabric. Dispersion is pumped into the pipe and out the opening 21 into the fabric. Wicking takes place through the fabric thickness and air bubbles emerging from the opposite surface tend to be carried into the dip tank 22 by the flooding action. The porous nature of the cloth allows some dispersion to emerge on the opposite surface of the fabric. A splash board 23 is positioned adjacent the opposite fabric surface and in line with pipe opening 21 to catch dispersion sprayed through the fabric and direct such dispersion into the dip tank. The spacing between pipe 20 and dip tank 22 is adjusted so that wicking through the entire thickness of the fabric occurs before the fabric dips into tank 22. Thus, the dip rate does not have to be slowed down commensurate with the wicking rate of the dispersion along the length of the fabric. Instead of pumping dispersion through a pipe opening to flood the fabric, the dispersion can be gravity flowed onto a surface of the fabric by passing it beneath an open-bottomed hopper which contains the dispersion.

The path of the fabric 2 in dip tank 22 can be established by a guide roll 24. Subsequent to the dip, stationary rods 26 and 28 can be provided adjacent the path of the coated fabric for wiping excess dispersion from the surface of the fabric. Further downstream, the coated fabric passes through a dryer 30 and an oven 32, with the rate of passage through the entire sequence of equipment being controlled by one or more pull rolls 34 which are driven to pull the fabric through the equipment. Alternatively, recoating can be done with a series of dip tanks 22 having a dryer 30 and possibly an oven 32 interposed therebetween. The early dip tanks in the series can be for applying polytetrafluoroethylene aqueous dispersion and one or more of the final tanks can be for applying the melt fabricable tetrafluoroethylene copolymer aqueous dispersion.

The present invention is especially useful in improving the release characteristics of conveyor belting and similar articles made of glass fabric coated with polytetrafluoroethylene by sealing all microscopic cracks in the polytetrafluoroethylene coating so that the articles conveyed cannot penetrate the coating and stick to the glass fabric. If the release characteristics of polytetrafluoroethylene are desired for the surface of a conveyor belt, then one or more further overcoats of polytetrafluoroethylene aqueous dispersion can be applied (in the same manner as the base coat) to the top coating of melt fabricable tetrafluoroethylene copolymer either before or after sintering the polytetrafluoroethylene undercoat on the glass fabric.

Another application in which the invention is a valuable contribution is in the area of inflatable roofs or architectural fabrics in general in which the polytetrafluoroethylene has the attribute of good weatherability and inflammability and the glass fabric supplies strength. Heretofore, the polytetrafluoroethylene coating has not protected the glass fabric from weathering because of the formation of microscopic cracks in the coating. The melt fabricable tetrafluoroethylene copolymer coating of the present invention seals these cracks and thus preserves weatherability by preventing moisture from reaching the glass fabric.

The glass fabric used in the present invention can be in the form of griege goods which means that the yarn of the fabric still has the lubricant coating from its manufacturing process, which enables the yarn to be woven into fabric without rupturing. The usual lubricant coating is a starch-oil composition. During the sintering of the polytetrafluoroethylene coating on the glass fabric the lubricant coating will decompose and darken but this does not harm the physical properties of the coated glass fabric. If it is desired that discoloration be avoided, the starch-oil coating can be removed prior to any coating operation according to the present invention by heating sufficiently to volatilize the lubricant, followed if desired by a washing step. A further alternative is to then apply a lubricant coating to the fabric of sufficient heat stability that it does not decompose during subsequent sintering of the polytetrafluoroethylene. An example of such a coating is a silicone sizing which can be applied by dipping heat cleaned fabric into a bath containing a silicone-emulsion such as Dow Corning ET-4327 silicone emulsion cut with water to a 1 – 5 weight percent silicone-solids level, and then drying at an oven temperature of 200° – 260°C.

By way of example, a fabric (35 × 35 – 150/2/2 warp and fill — 2 × 2 basket weave beta glass yarn) weighing approximately 12 oz. per square yard (415 g./m.$^2$) and being about 19 mils (0.48 mm.) thick with apertures between yarn of about 10 mil (.25 mm.) square was coated as follows: The polytetrafluoroethylene aqueous dispersion selected contained 60 percent by weight polytetrafluoroethylene particles having an average dia. of 0.35 micron by weight and 6 percent "Triton" X-100 nonionic surfactant based on the weight of polytetrafluoroethylene. The dispersion was diluted with distilled water to 45 percent solids. Fabric was coated in commercial equipment including in sequence a dip tank containing the dispersion and a dryer having a maximum temperature of 590°F. (310°C.) to dry but not sinter the coating on the fabric. The fabric was passed through the equipment at 3.4 feet per minute (1.7 cm./sec.). The resultant coated fabric weighed 18½ oz. per square yard (640 g./m.$^2$). The apertures between the yarn of the fabric were partly filled with dried, unsintered polytetrafluoroethylene. The previous coating operation was repeated and the fabric weight increased to 20 oz. per square yard (691 g./m.$^2$). The coating operation was again repeated and a third coat applied to make the cloth weight 23.3 oz. per square yard (807 g./m.$^2$). This recoating filled most of apertures between the yarns of the fabric with a coating of dry unsintered polytetrafluoroethylene. However, microscopic cracks were present in this coating and some of them extended over the glass yarn as well. This fabric was passed through 27 percent solids aqueous dispersion of a copolymer of tetrafluoroethylene with 15 to 20 percent by weight of hexafluoropropylene (m.p. 275°C.) at a rate of 3.4 feet per minute (1.7 cm./sec.). It then passed through an oven heated at about 600°F. (315°C.) maximum temperature, which caused melting of the copolymer but not sintering of the homopolymer base coat. Observation of the resultant coated fabric showed that the microscopic cracks were filled indicating that the copolymer was sealing the cracks. A second coat of copolymer was applied in like manner except that the oven temperature was increased to 730°F. (388°C.) causing complete melting of the copolymer top coat and sintering of the polytetrafluoroethylene base coat to get a resultant cloth weight of 24.9 oz. per square yard (862 g./m.$^2$) and a product which was crack free in appearance at a magnification of 20X. The resultant coated fabric was subjected to Weatherometer exposure for 1,000 hours, and the warp tongue tear test results before and after such exposure showed that the coated fabric had not lost any of its tear strength.

In another example using laboratory equipment the same type of fabric (12 oz. beta glass yarn) was dipped in 60 percent solids aqueous dispersion of polytetrafluoroethylene using the flooding technique described in FIG. 6 except that an open-bottom hopper was used to flood the fabric with dispersion. Sufficient dispersion was supplied through the open bottom of the hopper to cover the surface of the fabric as it passed beneath the hopper. The distance of the fabric path between the open bottom of the hopper and the dispersion in the dip trough was about one foot (30.5 cm.). The speed of the fabric through the equipment was one foot per minute (.5 cm./sec.) and the maximum drying temperature 400°F. (205°C.). The resulting fabric weight was 19.4 oz./yd.$^2$ (671 g./m.$^2$). A second coat of 60 percent solids polytetrafluoroethylene aqueous dispersion was applied in a similar manner but this time the maximum oven temperature was 700°F. (352°C.) which sintered the polymer. Fabric weight was 23.4 oz./yd.$^2$ (810 g./m.$^2$). Many microscopic cracks appeared in the coating from the exceptionally high coating thickness. A third coat was made similar to the second. The microscopic cracks persisted. Three coats of 30 percent solids tetrafluoroethylene/hexafluoropropylene copolymer (15–20 weight percent HFP, m.p. 275°C.) aqueous dispersion were applied to seal the cracks. The aqueous dispersion also contained 1½% of L-77, a silicone block copolymer wetting agent made by Union Carbide Co., based on the weight of co-polymer in the dispersion. The fabric speed was one foot per minute (.5 cm./sec.) and the maximum oven temperature 700°F. (352°C.). No flooding was necessary in applying the copolymer coating because the fabric was sufficiently sealed with polytetrafluoroethylene that wicking no longer occurred. The resulting fabric weighed 24.9 oz./yd.$^2$ (862 g./m.$^2$) and no cracks were observed at 20X magnification.

As many apparently widely different embodiments of this invention may be made without departing from the spirit and scope thereof, it is to be understood that this invention is not limited to the specific embodiments thereof except as defined in the appended claims.

I claim:

1. A glass fabric having a base coat of sintered polytetrafluoroethylene and a top coat of melt fabricable tetrafluoroethylene copolymer fused to said base coat.

2. The glass fabric of claim 1 having an over coat of sintered polytetrafluoroethylene on said copolymer top coat.

3. The glass fabric of claim 1 weighing at least 8 oz.-/yd.$^2$.

4. The glass fabric of claim 1 wherein the apertures between yarn of the fabric are at least 6 mils wide.

5. The glass fabric of claim 4 weighing at least 8 oz.-/yd.$^2$.

6. A process for preparing a crack-free polytetrafluoroethylene coated glass fabric, comprising applying a base coat of unsintered polytetrafluoroethylene to said fabric, applying to said base coat a top coat of melt fabricable tetrafluoroethylene copolymer which is heat bondable to said polytetrafluoroethylene, heating the resultant fabric sufficiently to sinter said polytetrafluoroethylene, followed by cooling the resultant fabric, the heating and cooling thereby fusing the top coat to the base coat.

7. The process of claim 6 wherein the polytetrafluoroethylene is applied in the form of a dispersion having from 55 to 65 percent by weight polytetrafluoroethylene dispersed therein, said polytetrafluoroethylene having an average particle diameter of at least 0.3 micron, and at least 1 percent surfactant based on the weight of said polytetrafluoroethylene.

* * * * *